United States Patent [19]
Reid

[11] Patent Number: 4,734,197
[45] Date of Patent: * Mar. 29, 1988

[54] JET AERATOR HEADER ASSEMBLIES AND METHODS FOR USE THEREOF IN TOTAL, PARTIAL, AND NON-BARRIERED OXIDATION DITCHES

[76] Inventor: John H. Reid, c/o Reid Engineering Co., 1211 Caroline St., Fredericksburg, Va. 22401

[*] Notice: The portion of the term of this patent subsequent to Jun. 19, 2001 has been disclaimed.

[21] Appl. No.: 839,588

[22] Filed: Mar. 14, 1986

Related U.S. Application Data

[63] Continuation-in-part of Ser. No. 433,638, Sep. 30, 1982, which is a continuation-in-part of Ser. No. 361,205, Mar. 24, 1982, Pat. No. 4,455,232, which is a continuation-in-part of Ser. No. 75,412, Sep. 14, 1979, Pat. No. 4,394,268, which is a continuation-in-part of Ser. No. 28,383, Apr. 9, 1979, Pat. No. 4,278,547, which is a continuation-in-part of Ser. No. 848,705, Nov. 4, 1977, abandoned, which is a continuation-in-part of Ser. No. 649,955, Jan. 19, 1976, abandoned, and a continuation-in-part of Ser. No. 621,740, Jun. 18, 1984, which is a continuation-in-part of Ser. No. 355,150, Mar. 5, 1982, Pat. No. 4,460,471, which is a continuation-in-part of Ser. No. 848,705, Nov. 4, 1977, abandoned, which is a continuation-in-part of Ser. No. 795,238, Nov. 5, 1985, which is a continuation-in-part of Ser. No. 282,592, Jul. 13, 1981, abandoned, which is a continuation-in-part of Ser. No. 28,383, Apr. 9, 1979, Pat. No. 4,278,547.

[51] Int. Cl.$^4$ .................................................. C02F 3/20
[52] U.S. Cl. ...................................... 210/629; 210/194; 210/220; 210/926; 261/DIG. 75; 261/77
[58] Field of Search ............... 210/196, 220, 926, 219, 210/221.1, 221.2, 629, 621, 628, 170; 261/DIG. 75, 77

[56] References Cited

U.S. PATENT DOCUMENTS

| | | | |
|---|---|---|---|
| 2,479,403 | 8/1949 | Powers | 261/DIG. 75 |
| 3,495,712 | 2/1970 | Schreiber | 210/220 |
| 3,671,022 | 6/1972 | Laird et al. | 261/26 |
| 3,954,921 | 5/1976 | Yoshida et al. | 261/DIG. 75 |
| 4,210,534 | 7/1980 | Molvar | 261/DIG. 75 |
| 4,365,938 | 12/1982 | Warinner | 417/54 |
| 4,440,645 | 4/1984 | Kite | 210/626 |
| 4,455,232 | 6/1984 | Reid | 210/926 |

FOREIGN PATENT DOCUMENTS

| | | |
|---|---|---|
| 2826259 | 1/1979 | Fed. Rep. of Germany ... 261/DIG. 75 |
| 942754 | 11/1963 | United Kingdom ....... 261/DIG. 75 |

*Primary Examiner*—Benoit Castel
*Attorney, Agent, or Firm*—Marion P. Lelong

[57] ABSTRACT

A jet aerator header assembly is provided for the deep oxygen contact duct of a partial, total, or non-barriered oxidation ditch having an endless channel. The header assembly may be vertically installed in the bottom of the contact duct or at an angle in the intake portion thereof as a mid-duct header assembly; it can additionally be installed in a horizontal position at the inlet of the contact duct as an inlet header assembly. Each header assembly comprises a liquid header, an air header, a plurality of jet aerators which are flow connected to both headers, stiffener plates which rigidly attach the headers to each other and to the jet aerators, and pipes connecting the headers to respective liquid and air supply lines. The mid-duct header assembly is slideably mounted within an access duct which is accessible from the surface. The mid-duct header assembly can be operated to provide: (1) a base level of dissolved oxygen in the mixed liquor being discharged from the contact duct, and (2) a minimum circulation velocity within the endless channel of the oxidation ditch. The inlet header assembly can then be selectively operated to provide the additional amount of dissolved oxygen in the discharge mixed liquor that is required for aerobic treatment of the wastewater entering the endless channel at that time and season of the year. Air and liquid can be separately and selectively controlled for both mid-duct and inlet headers. Such operation provides separate control of mixed-liquor circulation velocity and of mixed-liquor aeration.

23 Claims, 13 Drawing Figures

JET AERATOR HEADER ASSEMBLIES AND METHODS FOR USE THEREOF IN TOTAL, PARTIAL, AND NON-BARRIERED OXIDATION DITCHES

CROSS REFERENCE TO RELATED APPLICATIONS

This is a continuation-in-part of application Ser. No. 433,638, filed Sept. 30, 1982, now U.S. Pat. No. 4,585,555; which is a continuation-in-part of application Ser. No. 361,205, filed Mar. 24, 1982, now U.S. Pat. No. 4,455,232; which is a continuation-in-part of application Ser. No. 75,412, filed Sept. 14, 1979, now U.S. Pat. No. 4,394,268; which is a continuation-in-part of application Ser. No. 28,383, filed Apr. 9, 1979, now U.S. Pat. No. 4,278,547; which is a continuation-in-part of application Ser. No. 848,705, filed Nov. 4, 1977 now abandoned; which is a continuation-in-part of application Ser. No. 649,955, filed Jan. 19, 1976, and now abandoned; this is additionally a continuation-in-part of application Ser. No. 621,740, filed June 18, 1984, now U.S. Pat. No. 4,643,830; which is a continuation-in-part of application Ser. No. 355,150, filed Mar. 5, 1982, now U.S. Pat. No. 4,460,471; which is a continuation of application Ser. No. 848,705, filed Nov. 4, 1977, and now abandoned; this is further a continuation-in-part of application Ser. No. 795,238, filed Nov. 5, 1985, which is a continuation of application Ser. No. 282,592, filed July 13, 1981, and now abandoned; which is a division of application Ser. No. 28,383, filed Apr. 9, 1979, now U.S. Pat. No. 4,278,547.

BACKGROUND OF THE INVENTION

1. Field of the Invention

This invention relates to the activated sludge process of wastewater treatment. The invention especially relates to methods and apparatuses for aerating mixed liquor in activated sludge processes which are conducted in closed loop reactors, such as oxidation ditches.

2. Review of the Prior Art

Many liquid waste treatment processes, commonly termed aerobic processes, supply bacteria and other microorganisms with dissolved oxygen for treating aqueous wastes such as municipal sewage, tannery wastes, dairy wastes, meat-processing wastes, and the like.

One such aerobic process is the activated sludge process, in which the microorganisms are concentrated as an activated sludge to be mixed with incoming wastewater, which supplies food for the organisms. The apparatuses in which the activated sludge process is conducted comprise an aeration basin (reactor basin) and a final clarifier (settling tank). The aeration basin serves as a culturing basin in which to generate the growth of bacteria, protozoa, and other types of microorganisms, so that they can consume the pollutants in the raw waste entering the basin by converting the pollutants into energy, carbon dioxide, water, and cells (biomass).

The activated sludge process is effective for controlling this conversion activity within the aeration basin, for settling the biomass within the clarifier, for overflowing the purified liquor or effluent from the clarifier to discharge, and for returning the settled biomass from the clarifier to the aeration basin. Thus, the activated sludge process is a suspended growth, aerobic, biological treatment process, using an aeration basin and a settling tank, which is capable of producing very pure, high quality effluent, as long as the biomass settles properly.

The microorganisms in circuit flow of mixed liquor within the endless channels of oxidation ditches can be supplied with sufficient oxygen within the first or aerobic portion of the cyclic flow that they can form nitrite and nitrate ions from ammonia, which is derived from broken-down proteins, and then can be sufficiently deprived of oxygen during a second portion of the cyclic flow that certain other species of microorganisms can use the nitrite ions and nitrate ions and/or sulfate ions as oxygen sources, provided that a carbon-supplying food source, such as methanol, incoming wastewater, absorbed organic matter, or biomass cell carbon, is available. This process causes nitrogen to be liberated from the mixed liquor as bubbles of gas and is termed denitrification.

However, if temperature, biomass concentration, food supply, oxygen supply, and the like should change so that the aerobic portion of the endless channel is increased in length at the expense of the anoxic portion thereof (within which denitrification occurs), denitrification can continue while the withdrawn mixed liquor is being clarified. The unfortunate result is that nitrogen bubbles can rise within the clarifier and seriously interfere with settling of the biomass to form sludge and clarified liquor.

Aerators used in activated sludge systems include bubble diffusers, mechanical surface aerators (both high speed and low speed), submerged turbine aerators, horizontal rotors, and gas-liquid jet aerators, such as eddy jets. The horizontal rotors may be fixed, adjustable in height, or floating and may be fitted with brushes, blades, cages, or discs. "Submerged turbine aerator" is a term used in the wastewater treatment industry to describe a mixing device which comprises one or more axial-flow propellers or radial-flow impellers, in which compressed air or high-purity oxygen is diffused through the sparge device, located underneath the lower propeller or impeller which is attached to a vertically disposed shaft. The propeller may or may not be located within a vertically disposed discharge or intake duct.

Only vertically mounted low-speed mechanical surface aerators, horizontally mounted rotor aerators with brushes, blades, cages, or discs, and jet aerators had been usable in oxidation ditches until the invention of the total barrier oxidation ditch, as disclosed in U.S. Pat. No. 4,532,038 and in U.S. Pat. No. 4,460,471, both of which describe means for mounting and utilizing submerged turbine aerators within a deep oxidation ditch having a barrier athwart the channel, and both of which are incorporated herein by reference, and the invention of the partial barrier oxidation ditch, as disclosed in U.S. Pat. No. 4,278,547.

Apparatuses and methods are described in commonly owned U.S. Pat. No. 4,460,471 and U.S. Pat. No. 4,260,486 that provide a barrier oxidation ditch equipped with a feed means for return sludge; a feed means for raw wastewater; a downpumping draft tube axial-flow pump; a mounting means for the pump; a mounting means for the draft tube; a gas dispersal means for diffusing gas into the liquor to form a gas-liquor mixture; a feed means for delivering compressed oxygen-containing gas to the gas dispersal means; a deep oxygen contact duct which is in flow connection with the draft tube of the pump, passes beneath the barrier means at a greater depth than the floor of the oxidation ditch channel and discharges on the downstream side of the intake pump; and a barrier means for: (a) forcing all mixed liquor through the intake pump on the upstream side of the barrier means, (b) preventing backmixing of aerated liquor to the pump intake, and (c) accumulating all aerated liquor on the downstream side of the barrier means. The deep oxygen contact duct is preferably J- or U-shaped.

The deep contact duct may contain throughout any selected portion of its length a gas diffuser, a gas bubble-splitting and mixing means, or an interfacial surface generator. The deep contact duct may also be extended in the direction of flow for a sufficient distance that substantially all of the aerobic activity of the ditch occurs within the duct and under a selected hydraulic overpressure that is greater than the pressure corresponding to the depth of the channel.

The term "oxidation ditch" is currently used for relatively shallow oval-shaped basins in which mixed liquor is continuously circulated by horizontally mounted surface aerators, such as cage rotors and disc rotors, and other terms, such as continuous looped channel and endless channel, are currently used for basins in which the mixed liquor is continuously circulated by surface aerators through a plurality of side-by-side channel portions which have adjoining walls and square or semicylindrical ends providing connections between adjacent channel portions. However, the term "oxidation ditch" is employed herein as a general term encompassing both shallow and deep basins, whether circular, oval, or looped in any endless continuous loop or spiral configuration.

In such a closed-circuit oxidation ditch, this invention comprises at least one flow-control apparatus which provides repetitive aerobic treatment to all of the mixed liquor within the channel of the oxidation ditch. The flow-control apparatus of a total barrier oxidation ditch comprises a barrier which is sealably attached to the bottom and sides of the oxidation ditch and divides the mixed liquor into upstream liquor within an intake portion of the channel and downstream liquor within a discharge portion of the channel.

In a partial barrier oxidation ditch, the barrier may comprise an opening or gateway therein which may be contiguous with one or both sides or the bottom and which may be fixed or adjustable in size. In a non-barriered oxidation ditch, there is no barrier but a water barrier which prevents backmixing. These three barrier embodiments are hereinafter designated total, partial, or non-barriered.

The flow-control apparatus also comprises at least one axial-flow pump which operates within an inlet means, such as an inlet opening formed of concrete, or a draft tube and is disposed to receive the upstream liquor and pump it downwardly and further comprises a sparging device, generally mounted within the inlet means, for diffusing an oxygen-containing gas in the mixed liquor. Each pump/aerator is mounted by being attached to the aerator support bridge and comprises a motor, a speed-reduction means, a pump shaft, an axial-flow pump impeller attached to the lower end of the shaft, at least one ring sparge, and a downdraft tube surrounding the impeller and the sparge ring.

The deep oxygen contact duct is preferably connected to the downdraft tube, leads downwardly to any desired depth, curves in a downstream direction, and leads upwardly to a discharge point within the discharge portion of the channel.

It is pertinent to note that a conventional circuit-flow oxidation ditch of the prior art operates as a complete mix system except that its D.O. gradient is characteristically plug flow. Circulation of the entire basin contents during each cycle, while admixing the mixed liquor with the relatively minor stream of inflowing wastewater, ensures such complete-mix conditions.

Circular and elongated oxidation ditches in which the mixed liquor is aerated and propelled by banks of jet ejectors are described in U.S. Pat. No. 3,846,292 of Lecompte, Jr. (1974); No. 3,897,000 of Mandt (1975); and 4,199,452 of Mandt (1980). These jet ejectors, such as directional-mix jet aerators manufactured by Pentech Division of Clevepak Industries, Inc., Cedar Falls, Iowa, can be used in deep oxidation ditches, having a depth such as 20 feet, and can thereby have high rates of oxygen transfer compared to surface aeration methods while using diffused or subsurface aeration. However, flow above the jet aerators is induced flow, not pumped flow, so that it is unaerated and later blends with the highly aerated liquor which is ejected from the jets. Backmixing of aerated liquor readily occurs as eddies develop above the jets. Since multiple jet headers must act as booster pumps around the entire channel of a typical oxidation ditch in order to obtain adequate oxygen transfer, the entire channel must be constructed with considerable depth (typically, 10 feet or greater) in order to provide relatively high oxygen transfer efficiencies.

An oxidation ditch which includes a bank of venturi-type ejectors is described in U.S. Pat. No. 3,990,974 of Sullins (1976). A dissolved oxygen sensor controls pumping of liquor through the ejectors and thereby the quantity of air sucked from above the liquor level into the throats of the ejectors. Banks of vertical settler tubes are also disposed at one end of the oxidation ditch to effect settling of particles after impingement upon the inside surfaces of the tubes.

An oxidation ditch having a transversely disposed barrier across the channel is described in Hungarian Pat. No. 166,160 (1976) and Austrian Pat. No. 339,224 (1977), the barrier being traversed by a discharge duct containing a smaller duct within which an axial-flow impeller is disposed, whereby the smaller duct discharges within the larger one and functions as an upwardly discharging jet ejector because air bubbles are discharged from the blades of the impeller.

As of 1975, there were more than 500 municipal oxidation ditch installations of the horizontal rotor type in the United States and 90 in Canada, and there were 154 Carrousel installations in the world, according to "A Comparison of Oxidation Ditch Plants to Competing Processes for Secondary and Advanced Treatment of Municipal Wastes", by W. F. Ettlich, EPA-600/2-78-051, March 1978, National Technical Information Service, Springfield, Va., 22161. In this publication, these oxidation ditch plants are stated to provide flexibility in operation, a stable sludge, and performance above the average of all other competing secondary processes. Oxidation ditch plants were also found to be very competitive in operation and maintenance cost and to provide nitrogen removal at no additional cost.

However, these prior art oxidation ditches have many design and operational problems. Except for the jet ejector types, the pump/aerator devices of all prior art oxidation ditches are surface aerators. These devices produce spray and mist which create slippery walkways because of algae growth in summer and freezing in winter. They also cause excessive ice formation on the aeration equipment in the winter. Enhancing the surface area of liquor exposed to cold air by surface aeration further causes a loss of heat from the system and a reduction in reaction rates.

It is conventional practice in prior art oxidation ditches that their pump/aerators furiously aerate a portion of their liquor, while allowing the remainder to flow past untouched, and then the aerated and unaerated portions of the mixed liquor blend somewhere downstream of the pump/aerators to produce the desired dissolved oxygen content. From a hydraulic viewpoint, this practice can be termed "booster pumping", because the pump merely accelerates or adds energy to the mass of liquor flowing past the pump.

Such booster pumping seems to have developed because designers of prior art oxidation ditches have apparently believed that the kinetic energy in the induced-flow liquor is an asset that should not be interfered with. They have accordingly designed their ditches for booster pumping with single devices that combine the functions of pumping and aerating, whereby the momentum of the flowing liquor is merely augmented with each circuit-flow movement past the pump/aerator. Because the pumping function requires a relatively small input of energy, the principal capability of these devices is the aerating function. However, pumping and aerating functions cannot be utilized independently.

In consequence, a multi-component price has had to be paid for this value judgment as to the importance of kinetic energy. These price components include:

a. Heterogeneous aeration occurs when unaerated induced-flow liquor blends with highly aerated liquor to produce a blended downstream liquor having a desired average dissolved-oxygen content. Such heterogeneous aeration requires more energy than homogeneous aeration to the same dissolved-oxygen content because the same quantity of oxygen must be directly transferred, at a lower transfer rate, to a smaller volume of mixed liquor circulating in the oxidation ditch.

b. Inflexibility of operation occurs because the aerating and pumping functions of the pump/aerator are performed simultaneously by the same prior art device, whereby changing the submergence or the rotational speed of a pump/aerator simultaneously changes both the oxygen transfer rate and the oxidation ditch circulation velocity when it may be desirable to reduce oxygen transfer rate but not reduce oxidation ditch circulation velocity, for example.

c. Aeration efficiency cannot be improved by increasing the driving force of oxygen transfer into the mixed liquor by using higher hydrostatic pressures selectively in the oxygen transfer zone of the oxidation ditch.

Balancing the disadvantages of heterogeneous aeration is the benefit imparted by preserving at least a portion of the momentum in the translationally moving mixed liquor by providing a gateway in the barrier. Such a partial barrier oxidation ditch is disclosed in U.S. Pat. No. 4,278,547 which is incorporated herein by reference.

The inability to prevent backpumping of liquor from the discharge side toward the intake side of the aerator imposes some additional energy demands upon the system, while the inability to prevent backmixing of aerated mixed liquor with unaerated liquor is a much more serious cause of energy wastage. Backmixing reduces the amount of oxygen transferred into a given volume of mixed liquor circulating past or through a given aerator per unit of time. Additional energy is required to transfer a certain amount of oxygen per unit time or to attain a desired D.O. content when backmixing occurs because the necessary driving force for transferring oxygen increases non-linearly as the dissolved-oxygen content increases, according to the equation:

$$dC/dt = K(C_s - C)$$

where, at a given temperature of oxygen transfer:
C = initial oxygen concentration,
t = time
$C_s$ = saturation concentration of oxygen at the given temperature, and
K = the overall gas mass transfer coefficient (time$^{-1}$); it is a function of the resistance of the films and the area of liquid-gas interface per unit volume of liquid.

Figure 1:
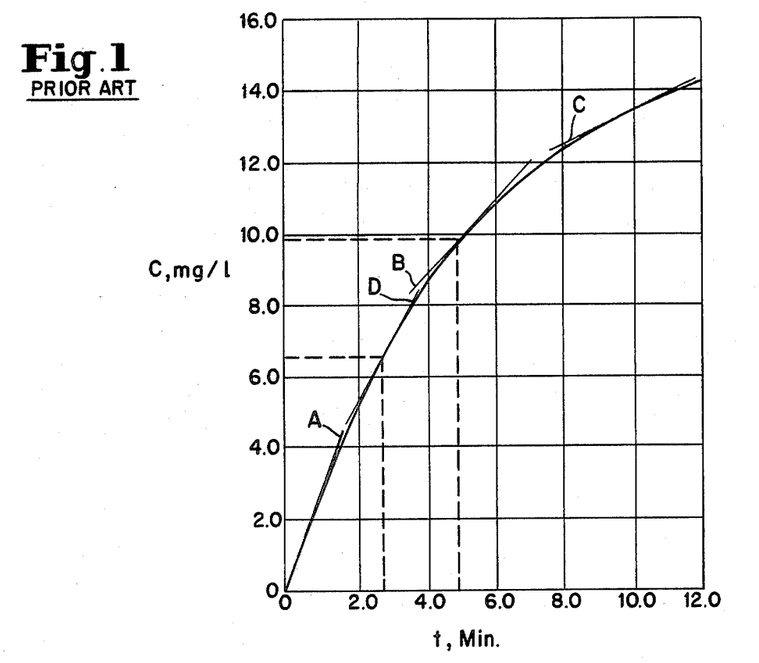
FIG. 1 is a graph which shows cumulative concentration of dissolved oxygen in initially deaerated water as a function of cumulative aerating time for a low-speed mechanical surface aerator in a tank, as conventionally obtained while testing prior art aerators.

As may be appreciated from FIG. 1, the rate of oxygen transfer, from bubbles of an oxygen-containing gas, such as air, to water, is a tangent, dC, to the solubility curve plotted from this equation (for initially deaerated water at 4° C. and an atmospheric pressure of 14.54 psi) at any time, t. If unaerated water is being aerated, the initial slope is quite steep, such as line A in FIG. 1 (equalling 4.0 in the units as shown). If backmixing occurs so that a mixture of aerated and unaerated water is aerated, the slope is much shallower, such as line B in FIG. 1 (equalling 1.1). If heavily aerated water reaches the aeration device, the slope can be very shallow, such as line C in FIG. 1 (equalling 0.53). It should, therefore, be quite clear that, with a given input of energy, backmixing will cause a considerably smaller quantity of oxygen to be transferred into a given circulation flow of water, as compared to the situation for aeration of unaerated water. Designers of prior art oxidation ditches, complete mix systems, and plug flow systems appear to have ignored the high cost of backmixing and even its very existence.

The inability of prior art oxidation ditches to prevent heterogeneous aeration, which occurs when highly aerated mixed liquor is blended with unaerated liquor, is also believed to be important. As can be appreciated by a glance at FIG. 1, when a quantity of aerated liquor having an oxygen concentration of 13.6 mg/l and an oxygen transfer rate C, after cumulative aerating for 10 minutes, is blended with an equal quantity having an oxygen concentration of zero and an oxygen transfer rate A, at zero aerating time, to produce a mixture having an oxygen content of 6.8 mg/l and an average cumulative oxygen transfer rate D (equalling 1.9), an average cumulative time of 5.0 minutes is spent on the entire blend, i.e., more energy is expended than would be required for homogeneously aerating up to slope D at cumulative time equalling 2.7 minutes. Expressed in other terms, aerating the entire quantity at a starting D.O. of 0.0 mg $O_2$/l for 5.0 minutes imparts 9.9 mg/l to the liquid, equivalent to line B. The difference between 9.9 and 6.8 represents a significant energy wastage when using the curve shown in FIG. 1 which is characteristic of one type of pump/aerator, as an example.

The combined effect of backmixing of aerated liquor to the aerator and of heterogeneous aeration, which occurs when unaerated liquor flows past the aerator and blends with aerated liquor somewhere downstream, is to force the final aeration time, t, to shift a significant distance along the aeration curve for the liquor, as illustrated by moving from the relatively steep tangent D to the shallower tangent B or even tangent C in FIG. 1.

All prior art oxidation ditches also lack a means to sparge or diffuse large quantities of air into the mixed liquor within the confined space of a deep oxygen contact duct to form an air-liquor mixture and thereby significantly increase oxygen transfer efficiency by raising oxygen dissolution pressure and oxygen solubility and by concentrating a high mixing power per unit volume into this confined space. The sparge tubes disclosed in U.S. Pat. No. 4,260,486 do provide a considerable amount of air, but they lack a means for concentrating a large number of high-volume air-diffusing devices within the ducts. Although jet aerators are adapted to form air-liquor mixtures in an exceptionally efficient manner, there is no known mounting means for installing and operating a plurality of them within the confined space of a deep oxygen contact duct.

Another serious problem is that a deep oxygen contact duct may be up to ten feet in diameter. The difference in hydrostatic pressure between the upper and lower jet aerators in a vertically disposed assembly thereof within a duct of such a size would accordingly cause at least a portion of these jet aerators to become inoperative. A means and a method for providing uniform pressures for each jet aerator are accordingly needed if jet aerators are to be seriously considered for such large contact ducts.

Furthermore, all ejection devices for air and liquids are subject to plugging, and this handicap would be especially likely if return sludge should be used as the liquid to be ejected. A means and a method for selectively cleaning the jet nozzles would therefore also be needed, regardless of the depth of installation of the jet aerators.

SUMMARY OF THE INVENTION

It is therefore an object of this invention to provide a mounting means for disposing and connecting a plurality of jet aerators to form a compact jet aerator header assembly in which the jet aerators are rigidly connected to air and liquid headers and simultaneously selectively oriented with respect to the flow directions of the mixed liquor when installed within the duct of an oxidation ditch.

It is further an object to provide a means and a method for installing a plurality of jet aerators within a deep oxygen contact duct of a total, partial, or non-barriered oxidation ditch.

It is additionally an object to provide a means and a method for efficiently and quickly removing a compact jet aerator header assembly from and replacing it within the deep oxygen contact duct of a total, partial, or non-barriered oxidation ditch.

It is also an object to provide a means and a method for discharging compressed air at uniform flow-rates from each of a plurality of jet aerators disposed at varying hydrostatic pressures within a deep oxygen contact duct of a total, partial, or non-barriered oxidation ditch.

It is still further an object to provide a means for pre-dispersing air into an aqueous fluid to form an aqueous mixture that can be more efficiently pumped to a selected hydrostatic pressure than air can be compressed to that pressure.

In accordance with these objects and the principles of this invention, means are provided for rigidly assembling and connecting each of a selected plurality of jet aerators to each other and to separate air and liquid headers, or to a combined header for an aqueous mixture, while orienting them in selected relationship to the direction of flow of the mixed liquor within a deep oxygen contact duct. This relationship includes downstream, upstream, perpendicularly and at any selected angle between upstream and downstream. The jet aerators can be alternately oriented according to these selected relationships.

Furthermore, it has surprisingly been discovered that these means, when installed in the deep oxygen contact duct, provide a process for pumping and aerating the mixed liquor that can, in combination with the sparge ring below the propeller of a draft tube pump/aerator, circulate the liquor in circuit flow within the endless channel of the oxidation ditch, without assistance from the axial-flow propeller under some conditions. In combination with a horizontally and concentrically disposed jet aerator duct inlet header assembly, as taught in Reid U.S. Pat. No. 4,455,232, which is herein incorporated by reference, the jet aerator mid-duct header assembly can also completely and easily replace the axial-flow propeller as a pumping and flow circulating means under substantially all conditions for both aeration and circuit-flow propulsion of the mixed liquor.

Moreover, the mid-duct header assembly and the inlet header assembly can be individually varied from zero to maximum air flow input while pumping of the liquid can also be individually varied. In consequence, pumping to maintain circulation velocity at a desired rate and independently aerating to maintain dissolved oxygen at a desired level at the beginning of the aerobic zone is as controllable as when using an axial-flow propeller. The mid-duct header assembly can be installed at any position along the duct at which bubbles can be ejected and oxygen transfer is obtainable. It can, moreover, be installed in surrounding relationship to the draft tube, but it is then identified as the jet aerator inlet header assembly.

The removal and replacement means for the mid-duct header assembly comprises: (1) an elongated access duct which extends from the surface, such as the top of the barrier, to the upper surface of a four-sided deep oxygen contact duct and to 6-12 inches below the bottom of a contact duct having a circular cross-section, and (2) an assembling, orienting, and support means which slides up and down within the access duct and which may comprise: (a) at least one liquid supply line, (b) at least one air supply line, (c) valves on each supply line, (d) a rapid disconnect means between each supply line and its delivery line, such as a flange, (e) a liquid header, (f) an air header, and (g) a plurality of stabilizers which rigidly attach the headers to the sides of the duct. Alternatively, a combined air-and-liquid supply line can be used to feed an aqueous air-and-liquid mixture to a combined air/liquid header. The access duct is typically about 18-24 inches deep and has a width that is 6-12 inches greater than the width or diameter of the deep oxygen contact duct. Each header is flow connected to its respective air or liquid delivery line, and each jet aerator is connected to both headers.

The access duct rests upon the upper surface of or fits closely within a deep oxygen contact duct having a rectangular or square cross-section and is inserted between sections of a contact duct having an oval, circular, or irregular cross-sectional shape, so that it protrudes beneath and on each side of the contact duct. The assembling, orienting, and support means for the jet aerators slide easily within the access duct and rests upon the bottom of the access duct.

The drawings disclose two embodiments of the invention for selectively placing a plurality of jet aerators within the deep oxygen contact duct of a total, partial, or non-barriered oxidation ditch, for flow connecting them with air and liquid headers, for selectively orienting the jet aerators in relation to the direction of flow of mixed liquor within the deep oxygen contact, and for selectively, quickly, and efficiently removing them from the contact duct and re-installing them within the duct in order to clean and/or replace the jet aerators. These embodiments relate to: (1) means for assembling, rigidly orienting, and flow connecting the jet aerators, and (2) suitable removal and replacement means in relation in the inlet and/or the mid-section of the conduct duct. The embodiments are based on two means for compensating for differing hydrostatic heads within the contact duct if the jet aerators are disposed, with respect to each other, in any other manner than horizontally.

The means for rigidly assembling, orienting, supporting, and flow connecting the aerators comprise at least one liquid header, at least one air header, interconnecting members which rigidly hold the headers together, connecting means from each header to each jet aerator, and connecting means from each header to liquid and air supply lines. The jet aerators are selectively oriented to point downstream and inwardly whereby turbulence is maximized and downstream flow velocity is accelerated.

As a means for counteracting the effects of hydrostatic head, the headers of a bilateral jet aerator mid-duct header assembly are disposed adjacently and horizontally and at the top and bottom of a square contact duct, as paired air and liquid headers. The upper and lower header pairs are served by separate delivery lines, separate valves, and separate supply lines leading to low-pressure and high-pressure blowers.

Alternatively, the paired air and liquid headers may be disposed vertically at each side of a square or rectangular contact duct. The air and liquid supply lines are then vertically disposed within the access duct and individually supply each header. Moreover, the paired air and liquid headers may also be disposed across the contact duct, such as being laterally spaced two feet apart.

The head counteracting means for a circular jet aerator header assembly comprises individually designed air flow openings for each jet aerator so that jet aerators at a greater depth are provided with larger air flow openings than jet aerators at a shallower depth, whereby the air flow is uniform for all of the jet aerators, from the top of the circular jet aerator assembly to its bottom.

The access duct and associated header assembly is preferably located along the length of the deep oxygen contact duct so that it is connected to that portion of the duct which is horizontally disposed. Alternatively, it may be located so that it is connected to one of the curved portions of the contact duct, preferably upstream of the horizontally disposed portion. The access duct may even be disposed at 45° to the horizontal.

In further accordance with the objects of this invention, another means for compensation for varying hydrostatic pressures is a means for dispersing the required quantities of air into the liquid, to form an aqueous mixture of liquid and dispersed fine bubbles, at a location between the submersible pump and the jet aerator header assembly. The liquid may be return sludge, clarifier effluent, final effluent from a further treatment operation, or mixed liquor from the intake of the channel.

A preferred mixing means is a Turbojett TM Mixer, supplied by Barrett, Haentjens & Co., 229 North Cedar Street, Hazleton, Pa., 18201. This mixer provides high intensity mixing and is capable of aspirating air, if desired, in addition to accepting compressed air. The mixing device receives an axial liquid feed (such as a chemical reagent) and a peripheral feed of air and raw water at three separate inlets. The air and raw water enter an annular chamber and then are fed to a cylindrical mixing chamber at about a 45° angle to the axis and at a tangent to a thin imaginary cylinder surrounding the axis.

When using the Turbojett TM Mixer or similar mixing devices, only one header, for the aqueous mixture, is used to supply the jet aerators which can also be simplified in construction by removal of the air flow nozzle in each jet aerator. Moreover, the liquid flow nozzles being used for liquid injection into the mixed liquor need not be changed in size in order to compensate for differing hydrostatic heads.

A still further advantage of providing a pre-formed aqueous mixture is that the low-pressure blowers are all that are needed; the high-pressure blowers can be left inoperative or removed. A further advantage of this premixing method is that the Turbojett TM Mixer is preferably installed in the vicinity of the surface, whereby plugging of the jet aerators becomes very unlikely. Plugging of the Turbojett TM Mixer, on the other hand, can be corrected quite easily because these devices are installed on the surface or in a location easily accessible thereto.

As an alternate to a draft tube aerator device a hydraulic driver or submersible electric driven pump can be installed at any location within the contact duct to provide flow pumping.

BRIEF DESCRIPTION OF THE DRAWINGS

The accompanying drawings in FIGS. 1–13 enable the invention to be better understood.

DESCRIPTION OF THE PREFERRED EMBODIMENT

Figure 2:
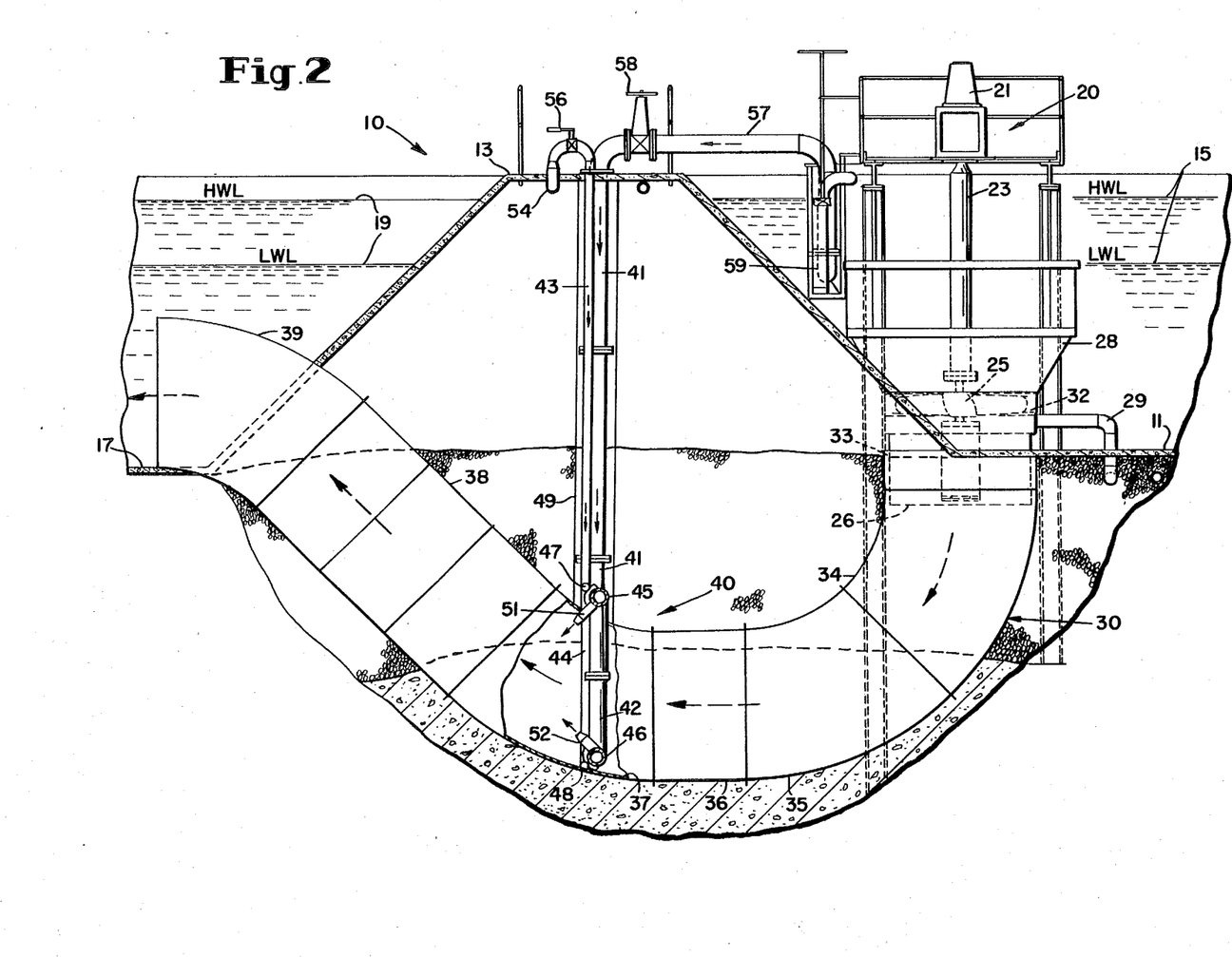
FIG. 2 is a sectional elevation of an axial-flow draft tube pump/aerator, comprising a deep oxygen contact duct which is flow connected to the draft tube, an air sparge of the diffuser ring type beneath the propeller, and a bilateral embodiment of the jet aerator duct header system of this invention within the deep oxygen contact duct.
Figure 3:
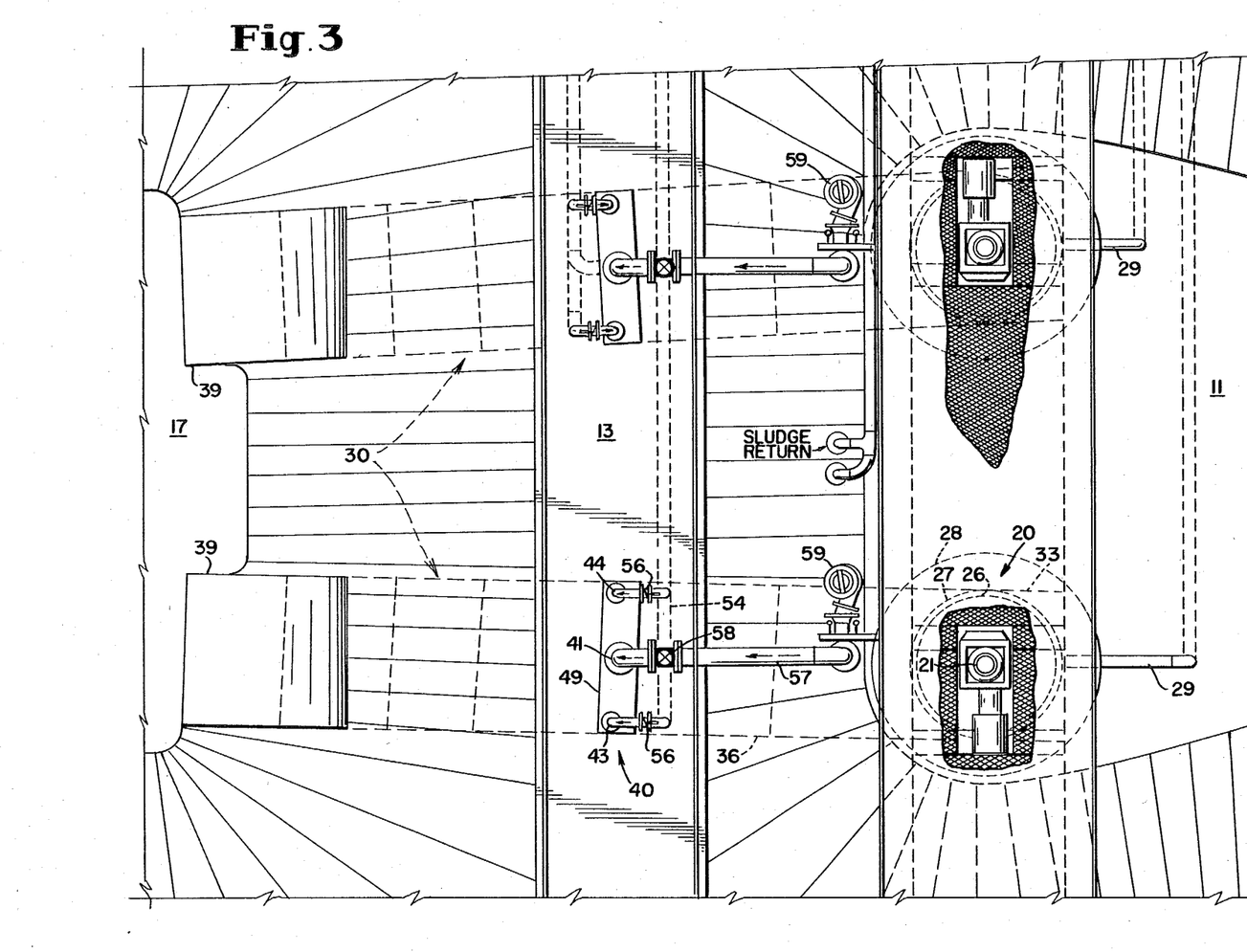
FIG. 3 is a plan view of the apparatus seen in FIG. 2.
Figure 4:
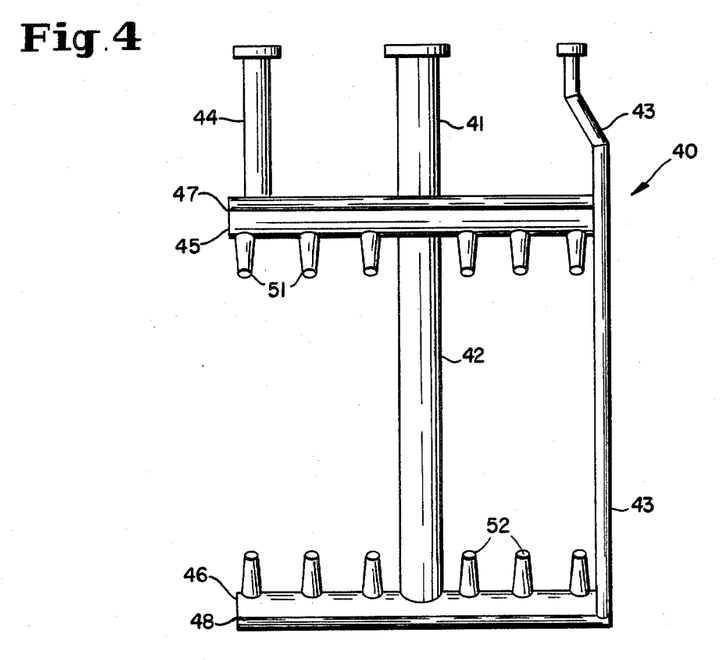
FIG. 4 is a front elevation of the jet aerator duct header system, taken in the direction of the arrows 4—4 in FIG. 2 comprising straight liquid and air headers which are horizontally disposed.
Figure 5:
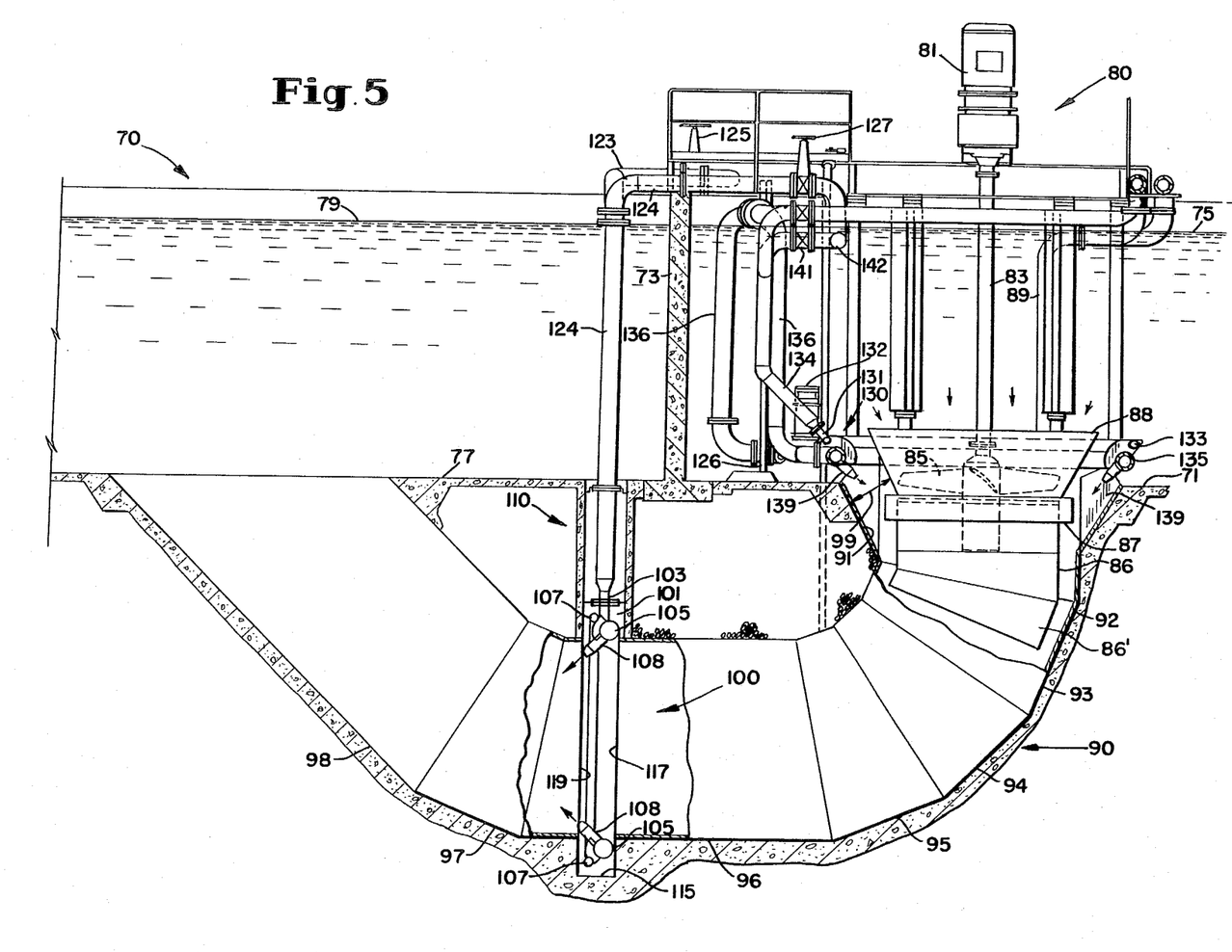
FIG. 5 is a sectional elevation of an axial-flow draft tube pump/aerator which is generally similar to the apparatus shown in FIG. 2 but which comprises a circular embodiment of the jet aerator duct header system of this invention within its deep oxygen contact duct and an induced-flow jet aerator inlet header system, as taught in U.S. Pat. No. 4,455,232.
Figure 6:
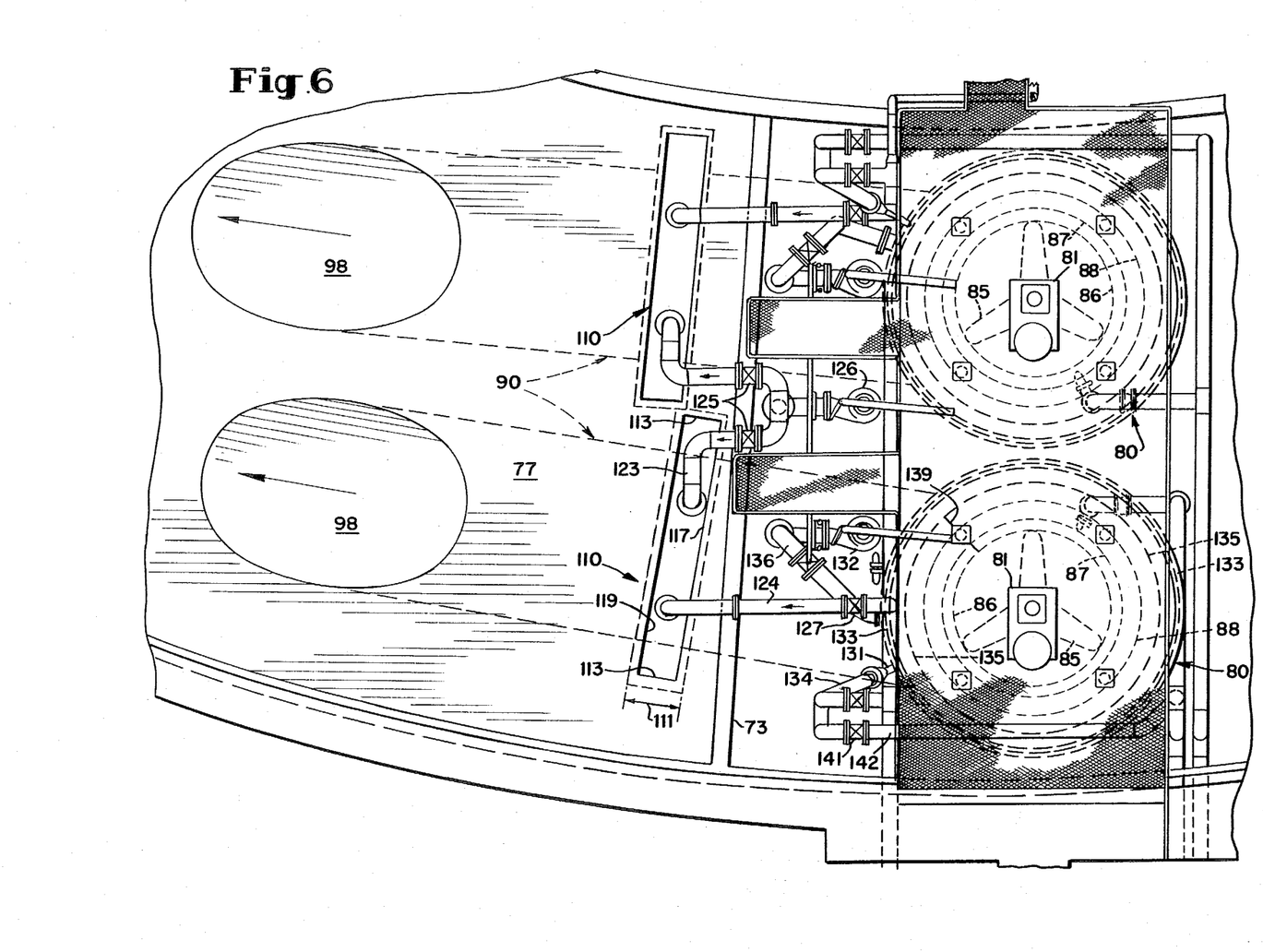
FIG. 6 is a plan view of the apparatus seen in FIG. 5.
Figure 7:
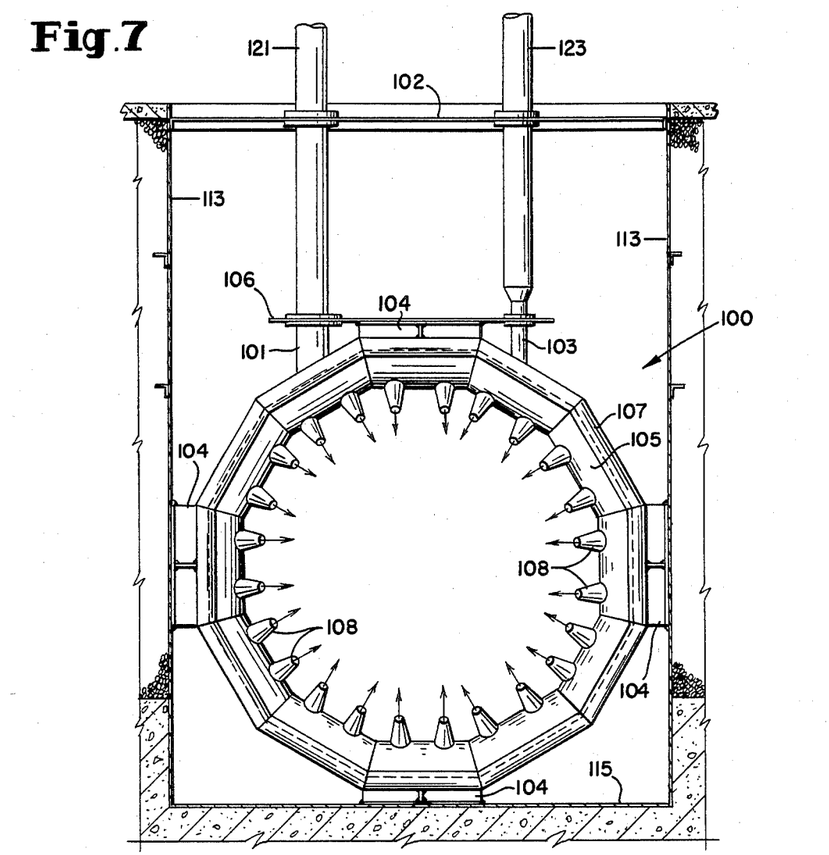
FIG. 7 is a front elevation of the jet aerator duct header system, comprising liquid and air headers which are circular and concentrically disposed as installed in a deep oxygen contact duct as shown in FIG. 5.
Figure 8:
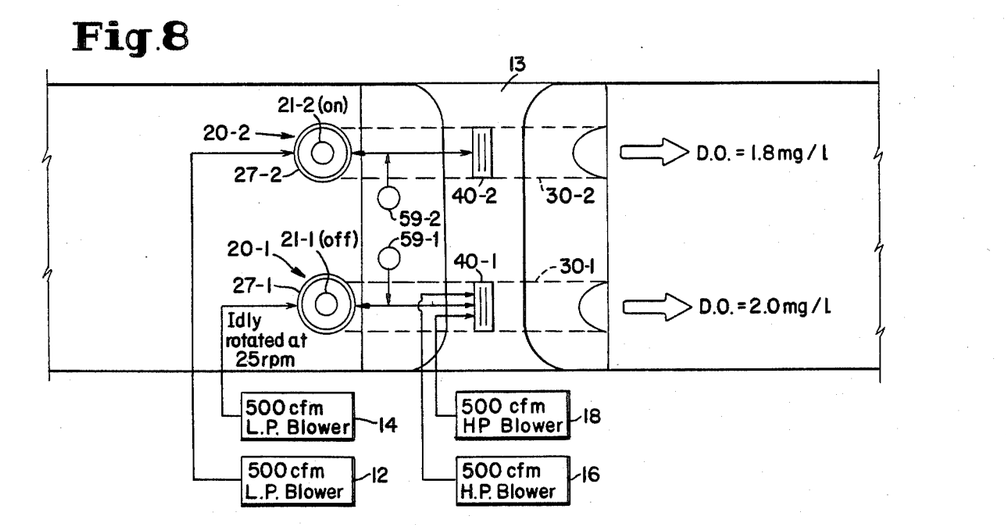
FIG. 8 is a simplified plan view of the barrier oxidation ditch shown in FIG. 3 with experimental information indicated thereon.
Figure 9:
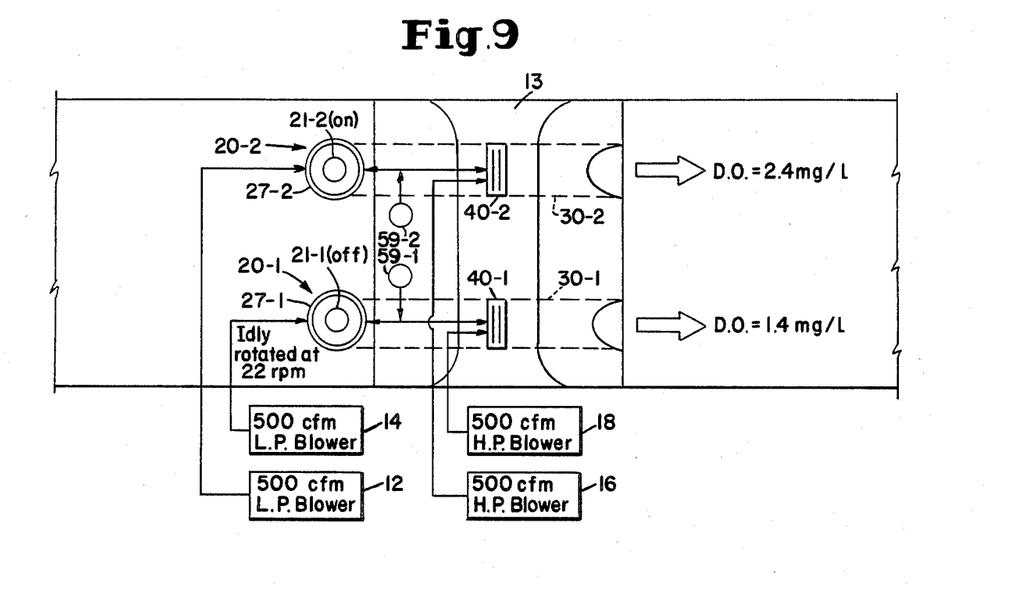
FIG. 9 is the same simplified plan view as seen in FIG. 8 with information about another experiment indicated thereon.
Figure 10:
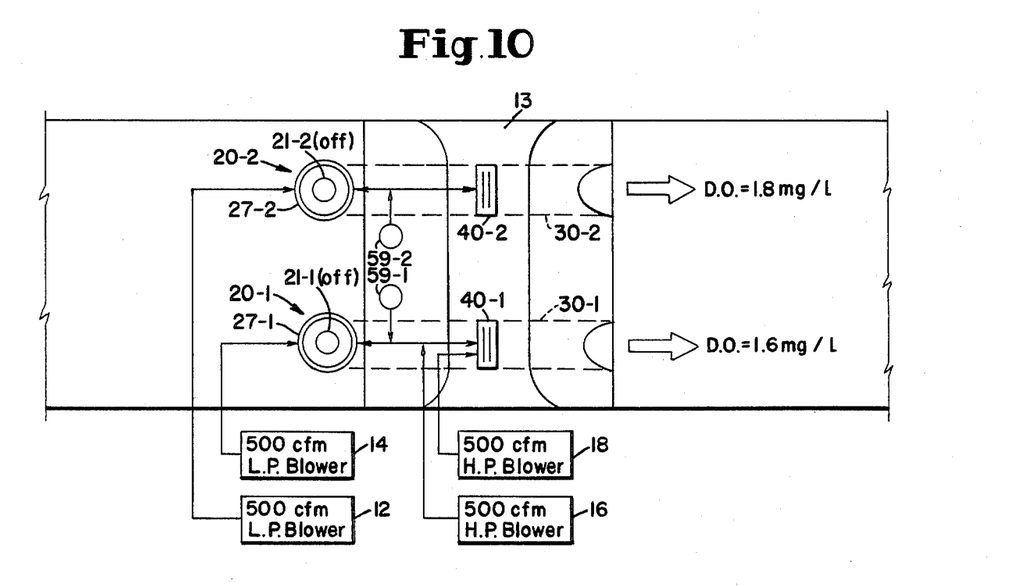
FIG. 10 is the same plan view as in FIGS. 8 and 9 with information about a third experiment indicated thereon.
Figure 11:
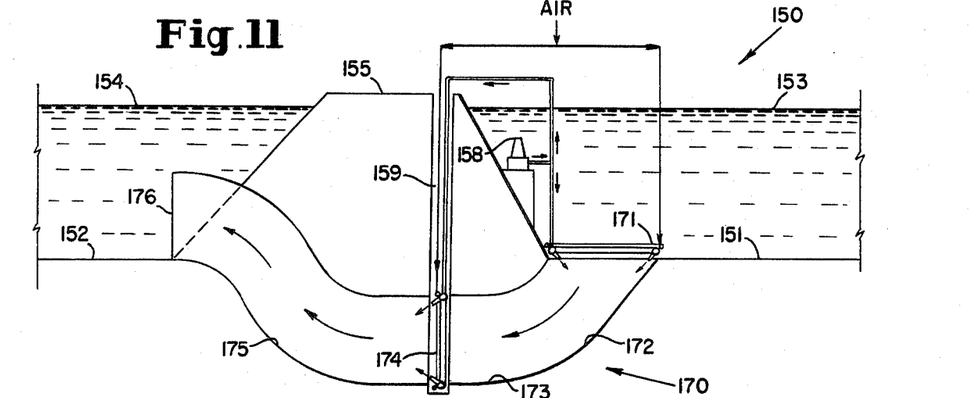
FIG. 11 is a sectional elevation of a portion of a partial barrier oxidation ditch having a jet aerator inlet header assembly which is disposed horizontally and at the intersection of the deep oxygen contact duct with the bottom of the intake portion of the endless channel.
Figure 12:
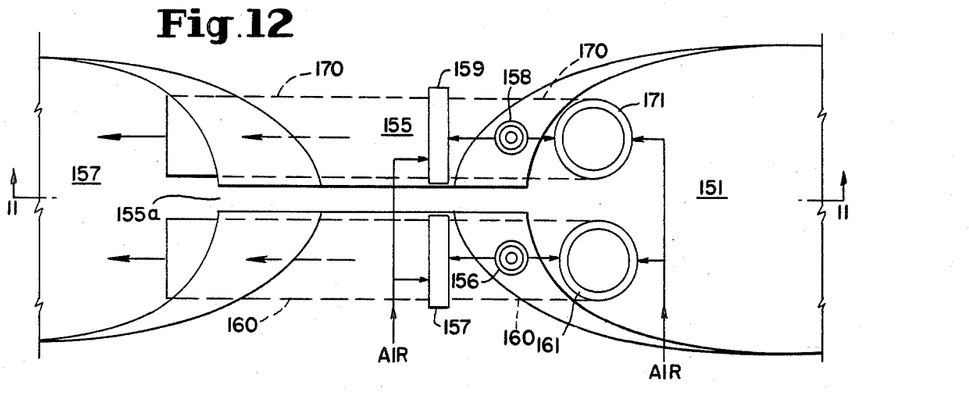
FIG. 12 is a plan view of the portion of the partial barrier oxidation ditch which is shown in FIG. 11 and has a flow-accelerating shape on the intake side of the barrier and a flow-decelerating shape on the discharge side of the barrier.

The drawings show a straight bilateral header embodiment in FIGS. 2–4, a circular bilateral header embodiment in FIGS. 5–7, conditions for three experimental tests in FIGS. 8–10, and a combination of jet aerator circular mid-duct header assemblies in paired deep oxygen contact ducts and jet aerator circular inlet header assemblies, without axial-flow impellers, in FIGS. 11 and 12.

In FIGS. 2, 3, and 4, a total barrier oxidation ditch 10 is shown which has an endless channel and a barrier 13. On the upstream side of barrier 13, the intake portion of the channel has a bottom 11 and a water level 15 which may vary from low water level (L.W.L.) to high water level (H.W.L.). On the downstream side of barrier 13, the discharge portion of the channel has a bottom 17 and a similar water level 19.

Pump/aerators 20 each comprise a motor and speed reducer 11, a motor shaft 23, an impeller 25 which is attached to shaft 23, a draft tube 26 which surrounds impeller 25 and has a funnel 28 along its upper edge, a ring sparge 27 which is disposed beneath impeller 25 and within draft tube 26, and air supply lines 29.

Deep oxygen contact duct 30 is square in cross-section and comprises a square duct extension 33 of the duct which fits around draft tube 26 and is sealably attached thereto, a first curved intake section 34, a second curved section 35, a straight middle section 36, a curved discharge section 37, a straight discharge section 38, and a terminal section 39.

In FIGS. 2 and 3, section 37 is shown as having jet aerator duct header assembly 40 therewithin. Assembly 40 comprises upper liquid lateral line or header 45, lower liquid lateral line or header 46, upper air lateral line or header 47, lower air lateral line or header 48, upper jet aerators 51, and lower jet aerators 52.

Air headers 47, 48 are respectively flow connected to air delivery lines 44, 43 which are flow connected to separate air delivery lines 54 which have individual air control valves 56, whereby the air pressure can be individually controlled to compensate for differing hydrostatic pressures in headers 47, 48. Liquid headers 45, 46 are respectively flow connected to liquid delivery line 41 and its extension 42 which are flow connected to a single liquid supply line 57 which is controlled by air control valve 58 and connected to liquid submersible pump 59.

In FIGS. 5, 6, and 7, a total barrier oxidation ditch 70 is shown which has an endless channel and a barrier 73. On the upstream side of barrier 73, the intake portion of the channel has a bottom 71 and a water level 75. On the downstream side of barrier 73, the discharge portion of the channel has bottom 77 and a similar water level 79.

Pump/aerators 80 each comprise a motor and speed reducer 81, a motor shaft 83, an impeller 85 which is attached to shaft 83, a draft tube 86 which surrounds impeller 85 and has a funnel 88 attached along its upper edge and an angled extension 86' attached along its lower edge, a ring sparge 87 which is disposed beneath impeller 85 and within draft tube 86, and air supply lines 89.

Deep oxygen contact duct 90 is circular in cross-section and comprises a vertical intake section 92 having a conical intake section 91 attached along its upper edge. Section 91 is parallel to funnel 88 and is spaced therefrom by distance 99. Duct 90 further comprises first, second, and third angled sections 93, 94, and 95, a straight bottom section 96, a first angled discharge section 97, and a terminal angled discharge section 98, each section being flow connected to the preceding section.

In FIGS. 5 and 6, section 96 is shown as having jet aerator bottom header assembly 100 therewithin. Assembly 100, as seen in FIG. 7, is a concentric embodiment and comprises a circular liquid header 105, and air header 107, and a plurality of jet aerators 108 which are each rigidly attached to liquid header 105 and supported by aerator stiffeners which attach air header 107 to liquid header 105. Jet aerators 108 are flow connected to both headers 105 and 107 and are disposed to eject a stream of liquid and air bubbles both inwardly and in the downstream direction.

Assembly 100 further comprises a liquid connecting line 101 which is flow connected to liquid header 105, a stiffener/splash plate 102 for lines 123 and 124, an air connecting line 103 which is flow connected to air header 107, a connection plate 106 for lines 101 and 103, and four stabilizer flanges and plates 104 which are each rigidly attached to air header 107.

Header assembly 100 slides into and fits within an access duct 110 which has width 111 and both accommodates and supports assembly 100. Access duct 110 comprises two lateral sides 113, a bottom 115, an upstream side 117, and a downstream side 119.

Header assembly 100 receives compressed air through air supply line 124, which is controlled by valve 127 and is flow-connected to line 103, and liquid from submersible pump 126 through liquid supply line 123, which is controlled by a valve 125 and is flow-connected to line 101.

A third air bubble-creating system is available for oxidation ditch 70. It is jet aerator intake header assembly 130 which is horizontally and concentrically disposed for ejecting streams of liquid and air bubbles into the circular induced-flow intake slot having width 99, between the side of funnel 88 and the side of cone 91. Assembly 130 comprises circular liquid header 135, circular air header 133, four jet aerators 138, and four-anti-vortex baffles 139 which rigidly conjoin headers 135, 133, and jet aerators 138. Liquid header 135 is flow-connected to a submersible pump 132 by liquid delivery line 136. Air header 133 is flow connected to the low-pressure blower (not shown in the drawings) by connecting line 131, air delivery line 134, air control valve 141, and air supply line 142.

Three tests were conducted with barrier oxidation ditch 10 and its associated apparatus, including pump/aerators 20-1 and 20-2 which consumed 100 horsepower (HP) apiece, deep oxygen contact ducts 30-1 and 30-2, jet aerator mid-duct header assemblies 40-1 and 40-2, ring sparges 27-1 and 27-2, low-pressure blowers 12 and 14 which produced 500 cubic feet per minute (cfm) and consumed 25 horsepower apiece, high-pressure blowers 16 and 18 which produces 500 cfm and consumed 40 H.P. apiece, and 15-HP submersible pumps 59-1 and 59-2 for the jet aerators header assembly which consumed 15 horsepower apiece. These tests are illustratively depicted in FIGS. 8, 9, and 10 and described in Examples 1–3.

EXAMPLE 1

A total barrier oxidation ditch 10, similar to the apparatus in FIGS. 2–4 and having two pump/aerators 20-1 and 20-2 as shown in FIG. 8, was tested for aerating efficiency by operating each submersible pump 59-1 and 59-2, high-pressure blowers 16, 18, and low-pressure blowers 12, 14 with pump motor 21-1 off and pump motor 21-2 on. Air from each high-pressure blower 16, 18 was fed to header assembly 40-1. Air from each low-pressure blower 12, 14 was fed to each ring sparge 27-1, 27-2, but ring sparge 27-1 would accept 500 cfm when the propeller was not operating under power because both high pressure blowers were supplying air to contact duct 30-1. The idle rotating speed of the impeller of pump/aerators 20-1 was found to be 25 revolutions per minute (rpm). The dissolved oxygen (D.O.) content from contact duct 30-1 was 2.0 mg/l. The D.O. from contact duct 30-2 was 1.8 mg/l.

The following tables gives the power used for the listed numbers of apparatuses utilized in the experiment illustrated in FIG. 8:

| No. | Apparatuses | Power Used, HP |
|---|---|---|
| 1 | Submersible Pump for Liquid Header | 15 |
| 2 | High pressure Blowers (40 HP) | 80 |
| 2 | Low Pressure Blowers (25 HP) | 50 |
| 1 | Axial-flow Pump (100 HP) | 100 |
| | Total | 245 |

By feeding all high-pressure air to the inoperative duct, more pumping action was obtained from this duct, and the ditch velocities were maintained at approximately 75% of normal velocity.

EXAMPLE 2

As seen in FIG. 9, the same oxidation ditch 10 was tested by feeding air from high-pressure blower 16 into contact duct 30-2 and air from high-pressure blower 18 into contact duct 30-1 and similarly by feeding air from low-pressure blower 12 into ring sparge 27-2 and air from low-pressure blower 14 into ring sparge 27-1. However, ring sparge 27-1 would accept approximately 350 cfm of air while the propeller was not operating under power.

The D.O. content of liquor discharged from duct 30-1 was 1.4 mg/l; the D.O. content of liquor discharged from duct 30-2 was 2.4 mg/l. The idled impeller for duct 30-1 rotated at 22 rpm.

The following table gives the power used for the listed numbers of apparatuses utilized in the experiment illustrated in FIG. 9:

| No. | Apparatuses | Power Used, HP |
|---|---|---|
| 2 | Submersible Pump for Liquid Headers | 30 |
| 2 | High Pressure Blowers (40 HP) | 50 |
| 2 | Low Pressure Blowers (25 HP) | 50 |
| 1 | Axial-flow pump (100 HP) | 100 |
| | Total | 260 |

EXAMPLE 3

The same oxidation ditch and associated apparatus, as seen in FIG. 10, were used for a test in which both pump/aerators 20-1 and 20-2 were shut down and the high-and-low-pressure blowers 12, 14, 16, 18 were fed to ring sparges and mid-duct header assemblies 27-1, 27-2, and 40-1, 40-2 in the same manner as in Example 2. The rpm's of the idle pump/aerators 20-1 and 20-2 were not measured. The D.O. of the liquor discharged from contact duct 30-1 was 1.6 mg/l. The D.O. of the liquor discharged from contact duct 30-2 was 1.8 mg/l, averaging 1.7 mg/l. It was estimated that ditch velocities in the range of 0.3–0.5 feet per second could be provided in the endless channel without using pump/aerators 20-1 and 20-2. These velocities would be acceptable as long as the settleability remained above 500 ml/1000 ml.

The following table gives the power used for the listed numbers of apparatuses utilized in the experiment illustrated in FIG. 10:

| No. | Apparatuses | Power Used, |
|---|---|---|
| 2 | Submersible Pump for Liquid Headers | 30 |
| 2 | High Pressure Blowers (40 HP) | 80 |
| 2 | Low Pressure Blowers (25 HP) | 50 |
| 0 | Axial-flow Pump (100 HP) | 0 |
| | Total | 160 |

Data for Examples 1–3 are given in the following table:

| Example No. | 1 | 2 | 3 |
|---|---|---|---|
| Total Horsepower | 245 | 260 | 160 |
| Average dissolved oxygen contact, mg/l | 1.9 | 1.9 | 1.7 |
| $\frac{HP}{mg/l}$ | 130 | 140 | 94 |

The power required per unit of dissolved oxygen (i.e., total horsepower required to produce one milligram of dissolved oxygen in one liter of mixed liquor) was clearly much lower when the circulation in the endless channel was obtained entirely by air from the blowers, as in Example 3.

Returning to the drawings, FIGS. 11 and 12 relate to an oxidation ditch 150 having an intake bottom 151 in a converging intake portion of its channel, a discharge bottom 152 in a diverging discharge portion of its endless channel, an intake water level 153, a discharge water level 154, a partial barrier 155, submersible pumps 156, 158, access ducts 157 and 159 located in partial barrier 155, an induced-flow passage 155a (thereby creating a partial barrier oxidation ditch), and a pair of deep oxygen contact ducts 160, 170.

Each duct 160, 170 is provided with two jet aerator header assemblies. As shown in FIG. 11 with respect to contact duct 170, for example, deep oxygen contact duct 170 has a jet aerator inlet header assembly 171, an inclined inlet portion 172, a horizontal bottom portion 173, a jet aerator mid-duct header assembly 174, an inclined discharge portion 175, and a terminal portion 176 which projects beyond barrier 155 into the diverging discharge portion of the endless channel. Each header assembly 171, 174 is preferably constructed similarly to header assembly 100 but may have as few as four jet aerators, as in header assembly 130. Alternatively, the duct itself may be square, rectangular, octagonal, or the like in cross-section, with each header assembly being similarly shaped.

Header and duct assemblies 171, 174 are fed with submerged or self-priming jet pump 156, 158. If the latter, the pump may use return sludge as its pumped liquid. The ratio of compressed air to liquid may be individually varied for feeding to each header assembly 171, 174. In addition, the pumped flow rate of the air/liquid mixture may be individually varied for each header assembly 171, 174. By selectively controlling these variables, the D.O. content of the mixed liquor discharged from terminal portion 176 and the flow velocity within the endless channel may be selectively and independently varied and controlled.

Figure 13:
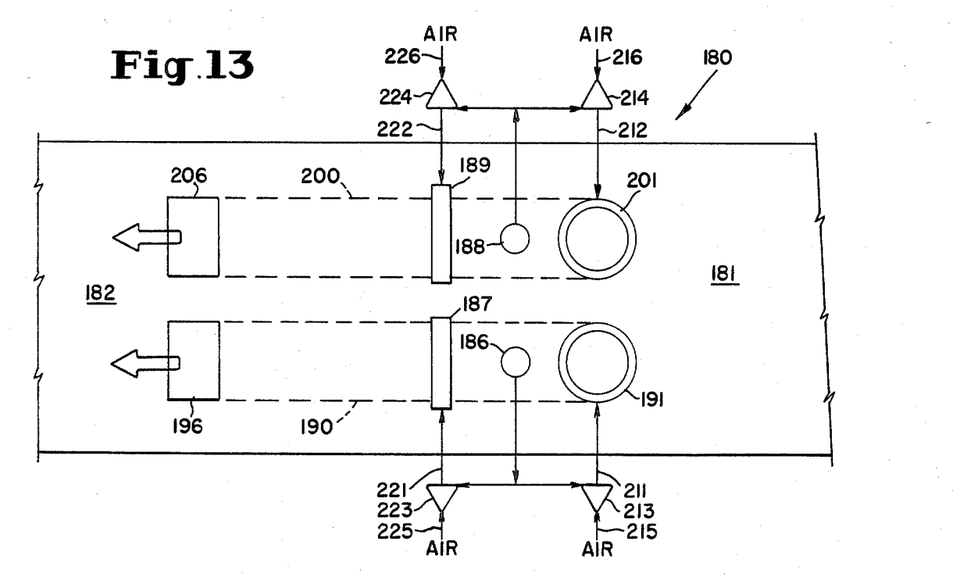
FIG. 13 is a plan view of a portion of a non-barriered oxidation ditch having a pair of deep oxygen ducts, each being equipped with a submersible pump, a low-pressure blower, a Turbojett TM Mixer for pre-mixing air and liquid, a jet aerator inlet header assembly, and a jet aerator mid-duct header assembly.

FIG. 13 relates to a non-barriered oxidation ditch 180 having an intake bottom 181 in an intake portion of its endless channel, a discharge bottom 182 in a discharge portion of its endless channel, submersible or self-priming pumps 186, 188, a pair of access ducts 187, 189, and a pair of deep oxygen contact ducts 190, 200. Each duct 190, 200 is provided with two jet aerator header assemblies which are jet aerator inlet header assemblies 191, 201 and the jet aerator mid-duct header assemblies in access ducts 187, 189.

Each inlet header assembly 191, 201 is preferably constructed similarly to header assembly 100 but may have as few as four jet aerators, as in header assembly 130. Alternatively, the duct itself may be square, rectangular, octagonal, or the like in cross-section, with each header assembly being similarly shaped.

Header assemblies 191, 201 are fed with an air/liquid mixture through mixture feed lines 211, 212 from a pair of Turbojett TM Mixers 213, 214 which are fed with liquid from pumps 186, 188 and with aspirated or compressed air in lines 215, 216.

Similarly, the mid-duct header assemblies in access ducts 187, 189 are fed with an air/liquid mixture through lines 221, 222 from a pair of Turbojett TM Mixers 223, 224 which receive liquid from pumps 186, 188 and air in lines 225, 226.

The ratio of compressed air to liquid may be individually varied for feeding to each Turbojett TM Mixer. In addition, the pumped flow rate of the air/liquid mixture may be individually varied for each header assembly. By selectively controlling these variables, the D.O. content of the mixed liquor discharged from terminal portions 196, 206 and the flow velocity within the endless channel may be selectively and independently varied and controlled.

Because it will be readily apparent to those skilled in the art of treating natural gas that innumerable variations, modifications, applications, and extensions of the examples and principles hereinbefore set forth can be made without departing from the spirit and the scope of the invention, what is hereby defined as such scope and is desired to be protected should be measured, and the invention should be limited, only by the following claims.

What is claimed is:

1. A jet aerator header assembly that is installd within and removable from, a deep oxygen contact duct which is mounted beneath and in flow communication with an endless channel, containing mixed liquor in translational movement, of a total, partial, or non-barriered oxidation ditch having a surface and a downflow pump, whereby at least a portion of said liquor flows through said duct, said assembly comprising:

A. a liquid header;
B. an air header;
C. a plurality of jet aerators which are flow connected to said liquid header and to said air header, said jet aerators being selectively oriented with respect to flow directions of said mixed liquor after said installation within said duct;
D. stiffening means for rigidly connecting said liquid header, said air header, and said jet aerator;
E. connecting means between said liquid header and a liquid supply line, said connecting means having sufficient length to extend from said surface to said contact duct;
F. connecting means between said air header and an air supply line; and
G, means for selectively installing said headers, said jet aerators, and said stiffening means within said contact duct.

2. The jet aerator header assembly of claim 1, wherein
said liquid and air headers are straight and disposed in parallel.

3. The jet aerator header assembly of claim 2 wherein said parallel liquid and air headers are vertically disposed and in adjacent pairs which are spaced apart.

4. The jet aerator header assembly of claim 2, wherein said parallel liquid and air headers are horizontally disposed in adjacent pairs which are spaced apart.

5. The jet aerator header assembly of claim 4, wherein said inlet end is provided with an annular induced-flow inlet passage within which said jet aerator header assembly is disposed so that a plurality of jet aerators are oriented to eject a mixture of liquid and air bubbles in the downstream direction of liquid flowing from said inlet end.

6. The jet aerator header assembly of claim 5 wherein:

A. said installing means comprises an access duct, having sufficient length to extend to the surface of said oxidation ditch, which is attached to and intersects said deep oxygen contact duct, whereby said flowing mixed liquor within said duct is accessible from said surface;
B said header assembly having means for slideably fitting within said access duct; and
C. during said installation, said jet aerator header assembly being slideably moveable from said surface to its operating position within said duct.

7. The jet aerator header assembly of claim 6, wherein said access duct is radially wider than the diameter of said deep oxygen contact duct.

8. The jet aerator header assembly of claim 1, wherein said liquid and air headers are circular and concentrically disposed.

9. The jet aerator header assembly of claim 1 which further comprises a means for compensating for varying hydrostatic pressures at said plurality of jet aerators.

10. The jet aerator header assembly of claim 9, wherein said compensating means comprises individually designed air flow openings for each said jet aerator so that said jet aerators at a greater depth are provided with larger air flow openings than said jet aerators at a shallower depth, whereby air flow is uniform for all said plurality of jet aerators.

11. A method for controllably and independently pumping and aerating a stream of mixed liquor flowing through a deep oxygen contact duct of a partial, total, or non-barriered oxidation ditch comprising an endless channel, said contact duct having an inlet end and a discharge end and an axis therebetween, comprising the following steps:
  A. providing a jet aerator header assembly at said inlet end;
  B. providing at least one jet aerator mid-duct header assembly between said inlet end and said discharge end, each said header assembly comprising:
    (1) a liquid header,
    (2) an air header which is disposed adjacent to said liquid header,
    (3) a plurality of jet aerators which are flow connected to said liquid header and to said air header,
    (4) means which rigidly attach said headers to said plurality of jet aerators, and
    (5) means respectively connecting said liquid and air headers to liquid and air supply means;
  C. operating said at least one mid-duct header assembly to provide:
    (1) oxygen transfer from air bubbles to said mixed liquor stream to create a base level of dissolved oxygen in said mixed liquor stream, and
    (2) a minimum circulation velocity within said endless channel; and
  D. selectively operating said inlet header assembly to provide the additional amount of dissolved oxygen in said mixed liquor that is required for treatment of a stream of inflowing wastewater.

12. The method of claim 11, wherein the volume of air sparged into said stream of mixed liquor from said mid-duct header assembly is approximately twice the volume of air sparged into said stream of mixed liquor from said inlet header assembly.

13. The method of claim 12, wherein approximately 0.05 to 0.25 cubic feet per second of said mixed liquor stream is pumped through said deep oxygen content duct for every cubic foot per minute of air that is sparged into said stream from said mid-duct header assembly.

14. The method of claim 13, wherein approximately 0.1 cubic feet per second of said mixed liquor stream are pumped through said contact duct for every cubic foot per minute of said sparged air.

15. The method of claim 12, wherein the volume of air sparged into said stream equals 50–70 percent of said volume of air.

16. A method for controllably and independently pumping and aerating a stream of mixed liquor flowing through a deep oxygen contact duct of a partial, total, or non-barriered oxidation ditch comprising an endless channel, said contact duct having an inlet end and a discharge end and an axis therebetween, comprising the following steps:
  A. providing a jet aerator header assembly at said inlet end;
  B. providing at least one jet aerator mid-duct header assembly between said inlet end and said discharge end, each said header assembly comprising:
    (1) an air/liquid mixture header,
    (2) a plurality of jet aerators which are flow connected to said air/liquid mixture header,
    (3) means which rigidly attach said mixture header to said plurality of jet aerators, and
    (4) means for flow connecting said header to an air/liquid mixture supply means;
  C. operating said at least one mid-duct header assembly to provide:
    (1) oxygen transfer from air bubbles to said mixed liquor stream to create a base level of dissolved oxygen in said mixed liquor stream, and
    (2) a minimum circulation velocity within said endless channel; and
  D. selectively operating said inlet header assembly to provide the additional amount of dissolved oxygen beyond said base level in said mixed liquor that is required for treatment of a stream of inflowing wastewater.

17. A selectively removable air bubble creating system installed within a deep oxygen contact duct disposed beneath, and in flow connection with, the endless channel of a total, partial, or non-barriered oxidation ditch containing mixed liquor in translational flow, comprising:
  A. a compact jet aerator header assembly, comprising:
    (1) a plurality of jet aerators,
    (2) air and liquid supply means, and
    (3) mounting means for said jet aerators which:
      (a) rigidly connect said jet aerators to said air liquid supply means, and
      (b) orient said jet aerators with respect to flow directions of said mixed liquors within said contact duct when said header assembly is in its operating position therewithin;
  B. means for selectively installing and removing said header assembly from said operating position within said contact duct; and
  C. means for discharging compressed air as dispersed fine bubbles and at uniform flow rates from each of said plurality of jet aerators substantially independent of hydrostatic pressure.

18. The system of claim 17, wherein said mounting means disposes said jet aerators at a plurality of selected hydrostatic pressures.

19. The system of claim 18, wherein said uniform flow rate discharging means comprises individually designed air flow openings for each said jet aerator so that said jet aerators at a greater said hydrostatic pressure are provided with larger air flow openings than said jet aerators at a lesser said hydrostatic pressure.

20. The system of claim 18, wherein said mounting means for said plurality of jet aerators is at least one header which is circularly shaped.

21. The system of claim 18, wherein said mounting means for said plurality of jet aerators is at least one header which is disposed at an angle to the horizontal.

22. The system of claim 18, wherein said air and liquid supply means comprises a mixing means for dispersing required quantities of air into a selected liquid to form an aqueous mixture of said liquid and dispersed fine bubbles, whereby uniform quantities of said mixture are dispersed into said deep oxgyen contact duct at said plurality of selected hydrostatic pressures.

23. The system of claim 17, wherein said installing and removing means comprises an access duct which is flow connected to said deep oxygen contact duct, said access duct extending to the surface surrounding said oxidation ditch and said jet aerator header assembly being slideably movable within said access duct.

* * * * *